Dec. 23, 1941.  J. SUNNEN  2,266,919
PISTON EXPANDER
Filed July 11, 1940
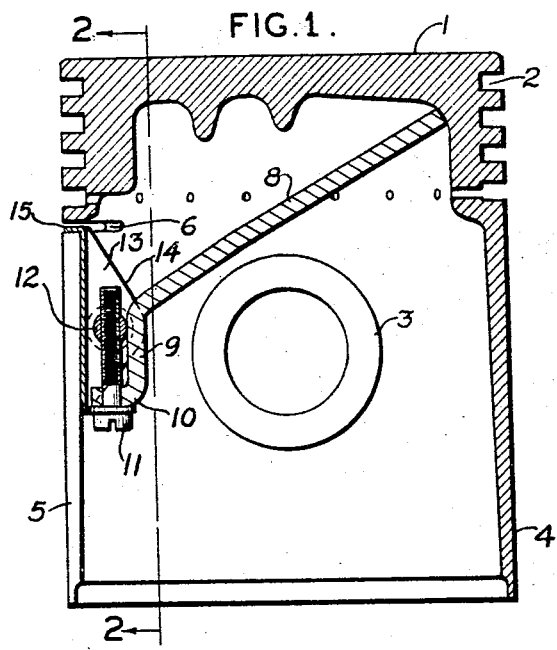
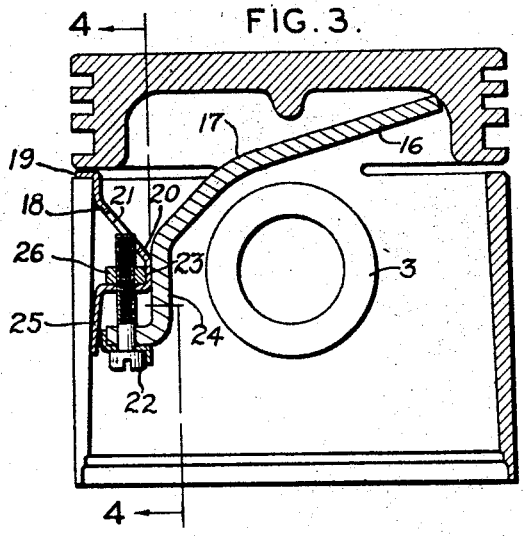
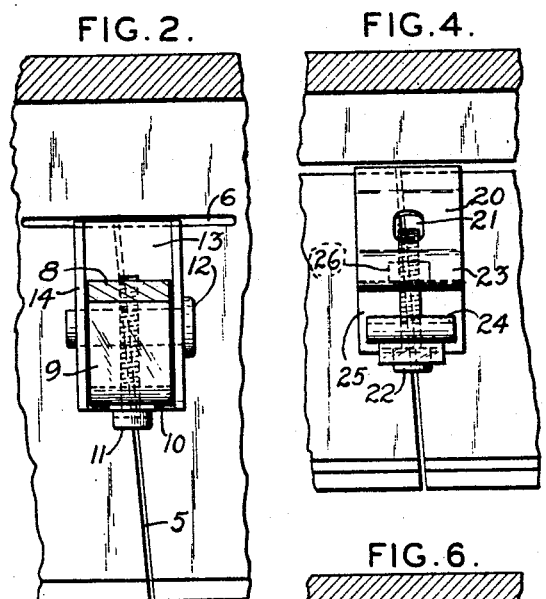
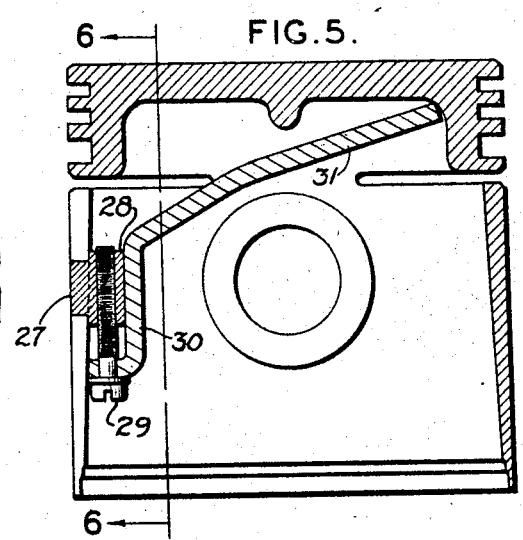
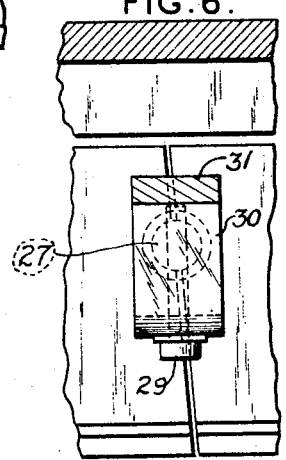
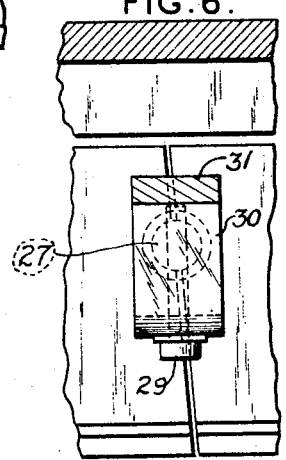
INVENTOR
JOSEPH SUNNEN
*George R. Ericson*
ATTORNEY Patented Dec. 23, 1941

2,266,919

UNITED STATES PATENT OFFICE 2,266,919

PISTON EXPANDER

Joseph Sunnen, Clayton, Mo.

Application July 11, 1940, Serial No. 344,975

17 Claims. (Cl. 309—12)

This invention relates to piston expanders and particularly to devices which are adapted to be installed in pistons of internal combustion engines when they become worn. It is well known that on account of the great mechanical stresses and friction to which pistons are subjected and the wide ranges of temperature, the walls may become badly worn and fail to function as intended, but the useful life of such pistons may be extended by the installation of suitable expanders.

In previous constructions of this kind, there has been considerable difficulty on account of the use of adjusting devices having a sliding action with the metal of the piston which it is not designed to withstand. Many pistons of this type are made of aluminum which is particularly susceptible to deformation by severe mechanical strain and also susceptible to continued deformation by a comparatively gentle but continuous strain. Such provisions have been made to alleviate this difficulty when using a sliding adjusting member in contact with the metal of the piston by using a highly flexible brace member to cause the expansion. But such constructions were subject to the difficulty that the mechanic in originally adjusting the piston could not determine accurately what the final diameter would be after weeks or months of continued strain of the flexible brace member.

One of the objects of this invention is to provide a new and improved piston expander which can be adjusted by the mechanic to the full diameter desired without the danger of substantial further expansion due to the continued strain imposed by the expanding means.

One object of the invention is to produce a simple and inexpensive piston expander which can be installed without the use of special tools and, in many cases, without removing the pistons from the cylinders.

Another object of the invention is to provide a piston expander which can be quickly and permanently adjusted without subjecting the soft metal of the piston to excessive strain which would cause local deformation and without the necessity of using highly flexible brace members which would cause continued deformation after the original adjustment is made.

Other objects and advantages will appear from the following description and accompanying drawing, in which:

Fig. 1 is a vertical sectional view of a piston having one form of my improved piston expander installed.

Fig. 2 is a partial elevation taken along the line 2—2 of Fig. 1.

Fig. 3 is a vertical sectional view of a piston having another form of my improved piston expander installed.

Fig. 4 is a partial elevation taken along the broken line 4—4 of Fig. 3.

Fig. 5 is a vertical sectional view of a piston having a third form of my improved piston expander installed.

Fig. 6 is a partial elevation taken along the line 6—6 of Fig. 5.

The reference numeral 1 indicates a piston of conventional type having ring grooves 2, wrist pin bosses 3, and a skirt 4 which is provided with intersecting vertical and transverse slots 5 and 6, respectively. These slots are usually provided in the piston, but, if not, they can readily be made by the mechanic who is to install the expanders. These slots permit diametrical expansion of the piston when pressure is applied from the inside by such means as my improved piston expander.

The form of expander shown in Figs. 1 and 2 comprises a substantially diagonal brace 8 extending from the upper inside corner of the piston to a point near the mid portion of the opposite side where it is bent downwardly to provide a vertical contact portion 9 and then outwardly to provide a horizontal screw receiving portion 10. A screw 11 which is threaded into a cross bolt 12 serves to adjust the vertical position of the diagonal brace. The cross bolt is mounted in a bracket 13 which is provided with upturned sides 14 to receive the cross bolt and outwardly turned lug 15 to fit into the groove 6.

With this form of the device, the mechanic merely has to partially withdraw the screw 11, put the diagonal brace 8 and the lug 15 into position and tighten the screw 11 in order to obtain the proper adjustment.

With the modification shown in Figs. 3 and 4, the diagonal brace 16 is provided with an additional bend indicated at 17 so as to clear the wrist pin boss 3 which, in this particular piston, is too close to the head of the piston to permit the use of the straight brace 8 shown in Fig. 1. Also, in the modification shown in Fig. 3, the bracket 18 is formed with a lug 19, diagonal portion 20 having a hole 21 to clear the screw 22, and a vertical portion 23 which serves the function of a rest for the vertical portion 24 of the brace 16. At the lower end of the vertical portion 23, the bracket is turned outwardly and horizontally and then downwardly at 25 so as to form a seat for the nut 26 and a lower contact member for contacting the piston skirt.

In this modification, as in the case of the structure shown in Figs. 1 and 2, the brace is provided with a vertical guide portion against the bracket so as to permit the brace to be adjusted by a sliding movement in the bracket instead of having a slide in the inner surface of the skirt. This construction has substantial advantages over previous constructions in which the hard metal brace had to rest against the soft metal of the piston and the adjustment is much more permanent, as there is no tendency for the soft metal piston surface to be deformed by the stationary bracket member, whereas any adjustment of the hard metal expander which might occur in contact with the soft metal of the piston skirt would result in deformation both during the adjustments and afterwards, so that the accuracy of adjustment would be lost.

These changes are also realized in the Fig. 5 construction in which a block member 27 is fitted into a hole bored in the piston wall. This block member is formed with the head 28 to receive the threads of the adjusting screw 29, and the end of the head 28 is made flat to form a bearing surface with the vertical portion 30 of the brace member 31.

In all of the modifications shown herein, the pressure of the adjustment is taken up by the stationary bracket or plug members which are in stationary contact with the skirt of the piston while the friction of the adjustment is taken up between the stationary bracket or plug and the diagonal member, the adjacent frictional surfaces of these members being specially designed for frictional contact with each other under pressure so that none of the metal will be deformed during the expansion and adjustment of the piston, and a much more permanent adjustment is thereby obtained.

It will be noted that while there is a slight bend in the diagonal brace members 16 and 31 necessitated by the location of the wrist pin, these members are sufficiently rigid to permit the initial adjustment of the piston to the proper diameter without the likelihood of too great expansion occurring after the job is installed, due to the continual strain which might be imposed by the use of a flexible brace.

I claim:

1. In combination with a piston having a head portion and an adjustable skirt, said skirt having a horizontal shoulder therein, an expander for said skirt including a brace element, a bracket fixed adjacent the inner face of said adjustable skirt, one end of said brace element engaging an inside portion of said head, said bracket being provided with a projection engaging said shoulder, and means adjustably securing the other end portion of said brace element to said bracket and in spaced adjustable relation to said skirt.

2. In combination with a piston having a head portion and an expansible skirt, and means for expanding said skirt including a brace element having one end portion engaging said head and the other end portion engaging a bracket fixedly positioned against the inner wall of said skirt, said bracket having a lug engaging a corresponding shoulder on said skirt.

3. In combination with a piston having a head portion and an expansible skirt, and means for expanding said skirt including a bracket adapted for connection with said skirt, interengaging means for holding said bracket and said skirt in position, a brace element, and a connecting element, said brace being swingably carried by said connecting element and said connecting element being adjustably connected to said bracket.

4. In combination with a piston having a head portion and an expansible skirt, an expander for said skirt including a brace element, one end of said brace element engaging the inner face of said head and adjusting means for the other end of said brace member including a bracket, means for adjustably connecting said bracket to said brace, and means including a shoulder and a lug for detachably connecting said bracket to said skirt.

5. In combination with a piston having a head portion and an expansible skirt, means arranged in said piston for expanding said skirt, said means including a brace extending diagonally between the head of the piston and said skirt, and means for connecting said brace element with said skirt and spacing the same therefrom, said means including a bracket, means including a shoulder and a lug for fixedly connecting the bracket to said skirt and means for adjustably connecting said bracket to said brace.

6. The combination of a piston including a head and an expansible skirt, means for expanding said skirt arranged in said piston and including a diagonally arranged member extending from said piston head to said skirt, the upper end of said diagonal member engaging said piston head and means connected to said skirt and spacing the lower end of said brace from said skirt, said means including a bracket having portions projecting inwardly from the skirt wall and means for engaging the inwardly projecting portion and the lower end of said brace for adjusting the latter to cause the expansion of said skirt, said bracket having a lug extending into a corresponding recess in said skirt.

7. An expander for pistons having expansible skirt portions, said piston expander including a flat plate, inwardly projecting spaced flanges, a pin supported by said spaced flanges, said pin being formed with a threaded aperture and being spaced from said plate, an adjusting screw engaging said threaded aperture, said screw being formed with an enlarged head spaced from the threaded portion of said screw, and a brace having a bent extremity engaging said screw between the head and the threaded portion and being adjustably supported by said screw with relation to said plate.

8. A piston expander including a body element formed with an outwardly extending securing means and an inwardly positioned bearing portion, an adjusting screw engaging said body element at a point intermediate said securing means and said bearing portion, a brace member, said brace member including an intermediate portion for engaging said bearing portion, an end portion for engagement with said supporting screw, and an angular portion for engaging said piston head.

9. In combination with a piston having a head portion and an expansible skirt, and means for expanding said skirt including a bracket formed with oppositely projecting portions, one of said projecting portions extending outwardly and being adapted to engage said skirt to secure said bracket in fixed position, an adjustable member carried by inwardly extending portions, and a brace element having one end carried by said adjustable member and its opposite end engaging an inside portion of said piston head.

10. A piston expander for association with a piston having an expansible skirt portion, said piston expander including a bracket, means for securing said bracket to the skirt of the cylinder, a horizontal pin supported by said bracket and formed with a threaded opening, an adjusting screw threaded into said opening, and a brace supported by said adjusting screw.

11. An expander for pistons having expansible skirt portions, said expander including a plate formed with parallel inwardly extending projecting portions, a transverse pin supported by said projecting portion, said pin being formed with an intermediate vertical threaded bore, an adjusting screw having an enlarged head and engaging said threaded bore, a brace formed with an angular portion seating on the enlarger head of said screw, and means for securing the bracket in fixed position against the inner wall of said skirt.

12. An expander for association with a piston having an expansible skirt, said expander including a bracket formed with spaced vertical wall portions for engagement with said skirt, the intermediate portion of said bracket including an inwardly extending horizontal wall portion and an angular wall portion, a supporting screw extending through the intermediate portions of said bracket, a nut on said screw interposed between the inwardly extending wall portions, and an angular brace member carried by said screw and adjustable therewith.

13. A piston expander including a bracket having an outwardly extending flange and inwardly extending intermediate spaced wall portions, a vertical wall portion connecting the spaced wall portions and forming an inwardly positioned bearing face, an adjusting screw extending through the spaced wall portions, a nut for said screw positioned between said spaced wall portions and engaging the inner face of the vertical wall portion, and an angular brace supported by and movable with said adjusting screw, said angular brace including an intermediate portion engaging said vertical outer bearing portion.

14. In combination with a piston having head portion and an expansible skirt, means arranged in said piston for expanding said skirt, said means including a brace element having one end portion engaging said piston head, a bracket element fixedly engaging said skirt and adjustably engaging the opposite end of said brace at a point inwardly spaced from said skirt, said bracket element being provided with a lug extending into a recess in said skirt to hold the bracket in position.

15. In combination with a piston including a head and an expansible skirt, a bracket element fixedly connected to said skirt, said bracket element including an inwardly projecting portion, a brace element extending from said piston head to a point adjacent said bracket, and means adjustably connecting one end of said brace to the inwardly projecting portion of said bracket.

16. In combination with a piston including a head and an expansible skirt, means for expanding said skirt including a bracket fixed to said skirt wall, said bracket including an inwardly extending portion and a bearing portion, a brace element having one end engaging the head of said piston and the other end terminating adjacent said inwardly projecting portion and being adjustably connected therewith, said brace including an intermediate portion engaging the bearing of said bracket, and means for preventing vertical movement of said bracket.

17. An expander for pistons having a head portion and an expansible skirt, a bracket element, means for securing said bracket element in fixed engagement with said skirt, said bracket element including an inwardly projecting intermediate portion, an adjusting member carried by said inwardly projecting portion, a brace member swingably supported by said adjusting member, and means for locking said brace member against swinging movement.

JOSEPH SUNNEN.